United States Patent
Ito et al.

(10) Patent No.: US 10,488,610 B2
(45) Date of Patent: Nov. 26, 2019

(54) OPTICAL FIBER UNIT AND OPTICAL FIBER CABLE

(71) Applicant: FUJIKURA LTD., Tokyo (JP)

(72) Inventors: Naoto Ito, Chiba (JP); Ken Osato, Chiba (JP); Masayoshi Yamanaka, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/092,952

(22) PCT Filed: Feb. 15, 2017

(86) PCT No.: PCT/JP2017/005476
§ 371 (c)(1),
(2) Date: Oct. 11, 2018

(87) PCT Pub. No.: WO2017/199494
PCT Pub. Date: Nov. 23, 2017

(65) Prior Publication Data
US 2019/0121042 A1    Apr. 25, 2019

(30) Foreign Application Priority Data

May 20, 2016 (JP) ................................ 2016-101551

(51) Int. Cl.
*G02B 6/44* (2006.01)

(52) U.S. Cl.
CPC .......... *G02B 6/441* (2013.01); *G02B 6/4403* (2013.01); *G02B 6/44* (2013.01); *G02B 6/443* (2013.01)

(58) Field of Classification Search
None
See application file for complete search history.

(56) References Cited

U.S. PATENT DOCUMENTS

| 5,165,003 | A | 11/1992 | Carter |
| 6,088,499 | A * | 7/2000 | Newton ............... G02B 6/4495 385/106 |
| 6,901,191 | B2 | 5/2005 | Hurley et al. |

(Continued)

FOREIGN PATENT DOCUMENTS

| AU | 2014333089 A1 | 4/2016 |
| CN | 1186573 A | 7/1998 |

(Continued)

OTHER PUBLICATIONS

Office Action issued in corresponding Korean Patent Application No. 10-2018-7020402, dated Nov. 22, 2018 (8 pages).

(Continued)

*Primary Examiner* — Jerry Rahll
(74) *Attorney, Agent, or Firm* — Osha Liang LLP

(57) ABSTRACT

An optical fiber unit includes: an optical fiber bundle formed by bundling a plurality of optical fibers; and a plurality of bundling members. One bundling member of the plurality of bundling members is wound on an outer circumference of the optical fiber bundle in a length direction of the optical fiber bundle, while reversing a winding direction alternately, and is joined to another bundling member at a section where the winding direction is reversed. A ratio of a width of a cross-section of the bundling member to a thickness of the cross-section of the bundling member is smaller than 20.

8 Claims, 8 Drawing Sheets

(56) References Cited

U.S. PATENT DOCUMENTS

| | | |
|---|---|---|
| 2003/0091307 A1 | 5/2003 | Hurley et al. |
| 2016/0103288 A1 | 4/2016 | Jost et al. |
| 2016/0223769 A1 | 8/2016 | Ito et al. |

FOREIGN PATENT DOCUMENTS

| | | |
|---|---|---|
| CN | 204832591 U | 12/2015 |
| EP | 1310814 A1 | 5/2003 |
| JP | H09178989 A | 7/1997 |
| JP | 2007-010917 A | 1/2007 |
| JP | 2012-088454 A | 5/2012 |
| JP | 2012-212097 A | 11/2012 |
| WO | 2015/052951 A1 | 4/2015 |
| WO | 2015/053146 A1 | 4/2015 |

OTHER PUBLICATIONS

Office Action in counterpart Australian Patent Application No. 2017265961 dated Oct. 18, 2018 (3 pages).
Office Action issued in corresponding Chinese application No. CN201780019335 dated Mar. 13, 2019 (13 pages).

\* cited by examiner

OPTICAL FIBER UNIT AND OPTICAL FIBER CABLE

BACKGROUND

The present invention relates to an optical fiber unit and an optical fiber cable.

Techniques are known for forming an optical fiber cable including optical fiber units which are optical fiber aggregates formed by bundling a plurality of optical fibers. In such techniques, it is common to employ a method wherein a rough winding string (bundling member) is wound around the bundle of optical fibers to thereby suppress/prevent the bundle of optical fibers from falling apart while allowing the optical fiber units to be differentiated from one another by the colors of the bundling members.

In relation to such bundling members, particularly FIG. 7 of Patent Literature 1 discloses a technique wherein the circumference of a bundle of a plurality of optical fibers is bundled with two bundling members by winding the two bundling members in an S-Z configuration, and the two bundling members are bonded and fixed together at sections where their winding directions are reversed. Further, Patent Literature 2 discloses a technique wherein three or more bundling members are provided to bundle a plurality of optical fibers, and a first bundling member is joined to a second bundling member at a contact point where it contacts the second bundling member, and is joined to a third bundling member at a contact point where it contacts the third bundling member, and a winding direction of a bundle of optical fibers is reversed at the contact point to the second bundling member and the contact point to the third bundling member.

CITATION LIST

Patent Literature

Patent Literature 1: JP 2012-88454A
Patent Literature 2: WO2015/053146

SUMMARY

The optical fiber unit disclosed in Patent Literature 1 and Patent Literature 2 has an advantage that workability when taking out an optical fiber is improved. When winding a bundling member with a width greater than a thickness in a section of the bundling member in an S-Z configuration, however, the bundling member is twisted in sections where their winding directions are reversed, and the bundling members may be joined to each other in an upright form with respect to the optical fiber bundle. There is a possibility that the optical fibers may break because of the joined part of the bundling members that is upright in this way gets entangled with another optical fiber bundle.

One or more embodiments of the present invention may suppress twists in sections where winding directions of bundling members are reversed.

An aspect of the invention may include an optical fiber unit including: an optical fiber bundle formed by bundling a plurality of optical fibers; and a plurality of bundling members, wherein one bundling member of the plurality of bundling members is wound on an outer circumference of the optical fiber bundle in a length direction of the optical fiber bundle, while reversing a winding direction alternately, is joined to another bundling member at a section where the winding direction is reversed, and a ratio of a width of a section of the bundling member to a thickness of the section of the bundling member is smaller than 20.

Other features of the present invention will be made clear by the following description with reference to the drawings.

Advantageous Effects

According to one or more embodiments of the present invention, twist can be suppressed in sections where winding directions of bundling members are reversed.

DETAILED DESCRIPTION

At least the following matters are made clear from the following description and the drawings.

An optical fiber unit will become clear including: an optical fiber bundle formed by bundling a plurality of optical fibers; and a plurality of bundling members, wherein one bundling member of the plurality of bundling members is wound on an outer circumference of the optical fiber bundle in a length direction of the optical fiber bundle, while reversing a winding direction alternately, is joined to another bundling member at a section where the winding direction is reversed, and a ratio of a width of a section of the bundling member to a thickness of the section of the bundling member is smaller than 20. According to such an optical fiber unit, twist in sections where the winding direction of the bundling member is reversed can be suppressed.

A ratio of a width of a section of the bundling member to a thickness of the section of the bundling member may be equal to or smaller than 18. In this way, twist in sections where the winding direction of the bundling member is reversed can be suppressed.

The bundling members may be joined with an adhesive. It may be particularly advantageous in such a case.

Where a number of the optical fibers is A, and a number of the bundling members is N, an area in which the optical fiber is exposed from the bundling member on an outer circumference of the optical fiber bundle may be equal to or smaller than 150 A/N mm². In this way, protruding out of optical fibers from a gap surrounded by the bundling members in the bending part of the optical fiber unit can be suppressed.

An area in which the optical fiber is exposed from the bundling member on an outer circumference of the optical fiber bundle may be equal to or smaller than 10 mm². In this way, the waterproof characteristic of the bundling members can be suppressed from deteriorating.

An optical fiber cable including: a plurality of optical fiber units; and an outer sheath for coating a plurality of the optical fiber units, wherein the optical fiber unit has an optical fiber bundle bundling a plurality of optical fibers, and a plurality of bundling members, one bundling member of the plurality of bundling members, is wound on an outer circumference of the optical fiber bundle along a length direction of the optical fiber bundle, while reversing alternately a winding direction, is joined to another bundling member at a section where the winding direction is reversed, and a ratio of a width of a section of the bundling member to a thickness of the section of the bundling member may be smaller than 20. In this way, twist in sections where the winding direction of the bundling member is reversed can be suppressed.

REFERENCE EXAMPLE

<Structure of Optical Fiber Unit 2 and the Like>

Figure 1A:
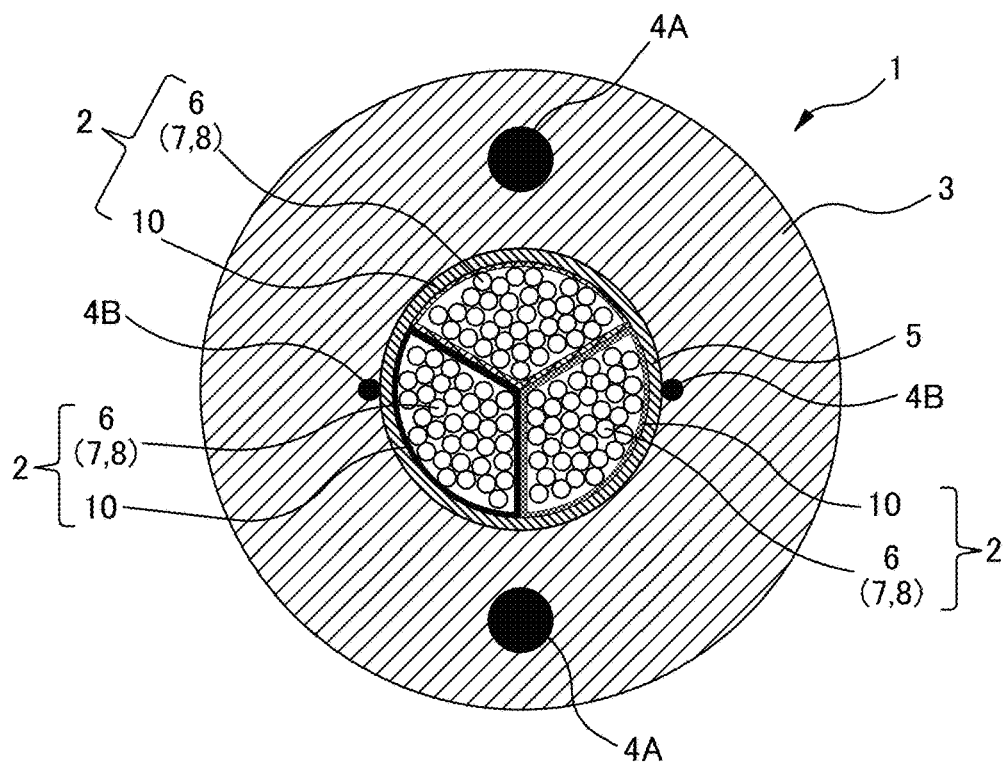
FIG. 1A is a sectional view of an optical fiber cable 1 including an optical fiber unit 2.

FIG. 1A is a sectional view of an optical fiber cable 1 including optical fiber units 2. The optical fiber cable 1 includes the plurality of optical fiber units 2 and an outer sheath 3. The optical fiber unit 2 is configured by bundling a plurality of optical fibers 8 with a bundling member 10. A detailed configuration of the optical fiber unit 2 will be described later. Here, the optical fiber cable 1 includes three optical fiber units 2. The three optical fiber units 2 are covered with a wrapping tape 5, and are coated on the outside with the outer sheath 3. Tension members 4A and rip cords 4B are buried in the outer sheath 3.

Figure 1B:
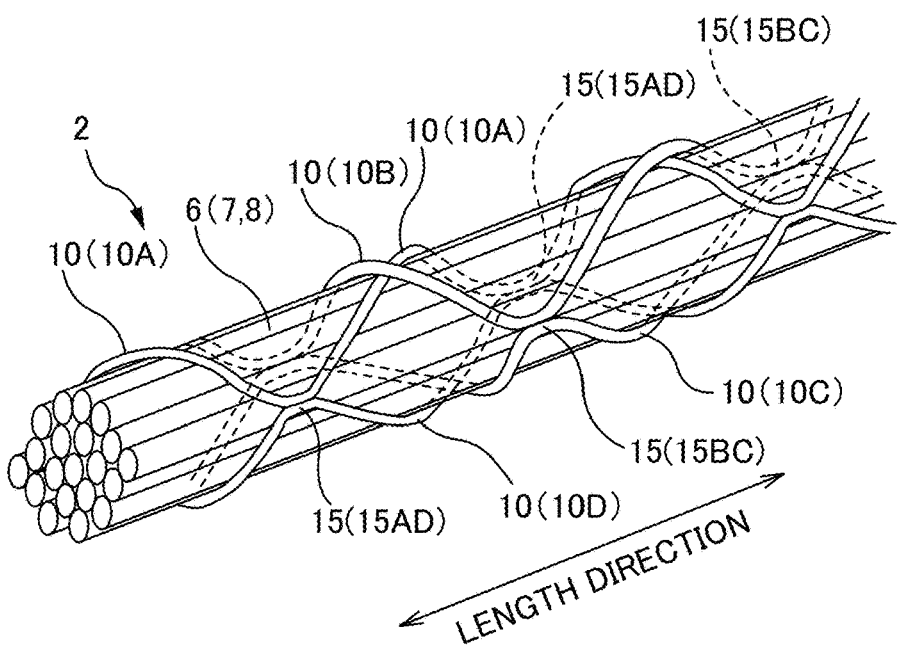
FIG. 1B is a perspective view of an optical fiber unit 2 of a Reference example.

FIG. 1B is a perspective view of the optical fiber unit 2 in a Reference example. The optical fiber unit 2 is configured by bundling a bundle of a plurality of optical fibers 8 with a bundling member 10. Below, a bundle of the plurality of optical fibers 8 is referred to as an optical fiber bundle 6. The bundling member 10 is wound around on an outer circumference of the optical fiber bundle 6, and in this way the plurality of optical fibers 8 are bundled such that they do not fall apart. Here, the optical fiber bundle 6 bundles a plurality of optical fiber ribbons 7 with discontinuous connections.

Figure 2:
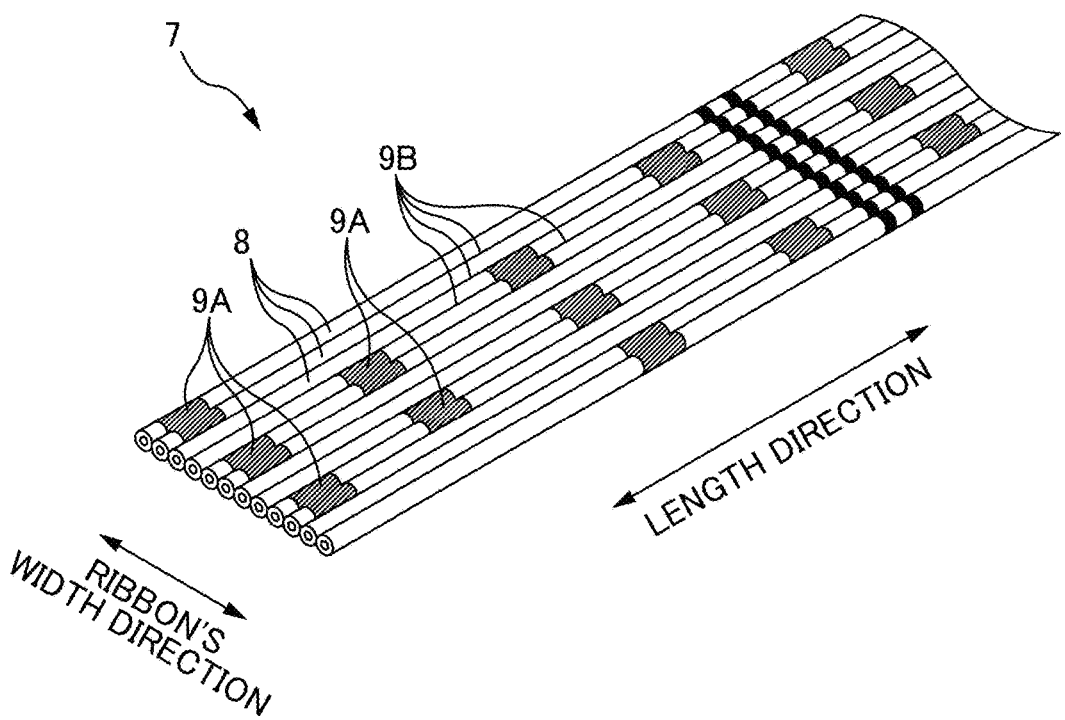
FIG. 2 is an explanatory view of an optical fiber ribbon 7 with discontinuous connections.

FIG. 2 is an explanatory view of an optical fiber ribbon 7 with discontinuous connections. The optical fiber ribbon 7 with discontinuous connections is an optical fiber ribbon 7 in which a plurality of optical fibers 8 are aligned and discontinuously connected. Here, twelve optical fibers are aligned and connected. The adjacent two fibers of the optical fibers 8 are connected with connection parts 9A. A plurality of connection parts 9A are arranged discontinuously in a length direction between adjacent two fibers of the optical fibers 8. The plurality of connection parts 9A of the optical fiber ribbon 7 with discontinuous connections are arranged discontinuously two-dimensionally in the length direction and a ribbon width direction. Regions other than the connection parts 9A between adjacent two fibers of the optical fibers 8 are non-connected parts 9B. In the non-connected parts 9B, adjacent two fibers of the optical fibers 8 are not tied to each other. Thus, the optical fiber ribbon 7 with discontinuous connections can be rolled up into a tubular shape (bundle shape), or can be folded up, thus enabling multiple optical fibers 8 to be bundled at high density.

It should be noted that, the optical fiber ribbon 7 with discontinuous connections configuring the optical fiber bundle 6 is not limited to that shown in the diagram. For example, arrangement of the connection parts 9A may be changed. Further, the number of the optical fibers 8 configuring the optical fiber ribbon 7 with discontinuous connections may be changed. Further, the optical fiber bundle 6 does not have to be configured with the optical fiber ribbon 7 with discontinuous connections, and for example, may be configured by bundling the plurality of single fiber optical fibers 8.

The bundling member 10 is a member for bundling the plurality of the optical fibers 8. The bundling member 10 is a string shaped, cord shaped, or ribbon shaped member that can tie the plurality of the optical fibers 8. The bundling member 10 is wound around on an outer circumference of the optical fiber bundle 6. With the optical fiber unit 2 in FIG. 1B, the optical fiber bundle 6 is bundled with four bundling members 10, but the bundling members 10 around the optical fiber unit 2 can be more than four. In the below description, an index (A-D) can be added to the bundling member 10, to differentiate and describe each bundling member 10.

The bundling members 10 are colored with predetermined colors, and function also as differentiating members. Each bundling member 10 of each optical fiber unit 2 is colored with a color different from each other, and thus can be differentiated. As shown in FIG. 1B, in the case where each optical fiber unit 2 includes four bundling members 10, depending on the combination of colors of the bundling member 10, each optical fiber unit 2 can be differentiated. Further, instead of coloring the bundling members 10, a differentiating mark may be printed on a surface of the bundling member 10.

The bundling members 10, for example, a bundling member 10(A) and a bundling member 10(D), are joined, using an adhesive. As an adhesive for joining the bundling members 10, for example, an adhesive such as modified olefin having ultraviolet cure resin or a solvent, or a reactive adhesive having such a component as an epoxy adhesive can be used. Further, the bundling members may be joined by heat-sealing, and not by using an adhesive.

Figure 3:
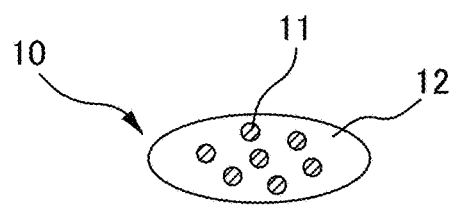
FIG. 3 is a diagram illustrating a cross-sectional structure of a bundling member 10 when joining by heat-sealing.

FIG. 3 is a diagram illustrating a cross-sectional structure of a bundling member 10 when joined by heat-sealing. The bundling member 10 has core parts 11 and a coating part 12. The core parts 11 are members that extend in the length direction of the optical fiber unit 2, and the bundling member 10 has a plurality of core parts 11. The coating part 12 coats the periphery of the core parts 11, and is a member having a lower melting point than a melting point of the core parts 11. The two bundling members 10 that bundle the optical fiber unit 2 are heat-sealed at intersections of the members, with adhesiveness that develops when the coating part 12 is heated to melting point or above. A difference between the melting point of the core part 11 and the melting point of the coating part 12 may be 20° C. or more. The melting point of the core part 11 may be 200° C.-230° C., and the melting point of the coating part 12 may be 150° C.-180° C. Further, with the coating part 12, it may be that even when the coating part is heated and melts it does not adhere to the optical fiber 8 nor has low adherence even when it adheres, and does not degrade the coating layer of the optical fiber 8.

Figure 4A:
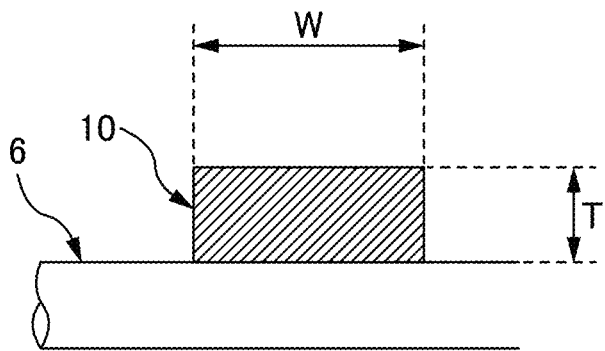
FIG. 4A to FIG. 4C are cross-sectional views of a bundling member 10 explaining cross-sectional shapes of the bundling member 10.
Figure 4B:
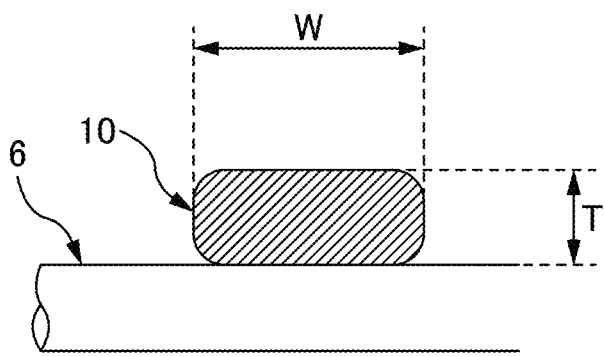
Figure 4C:
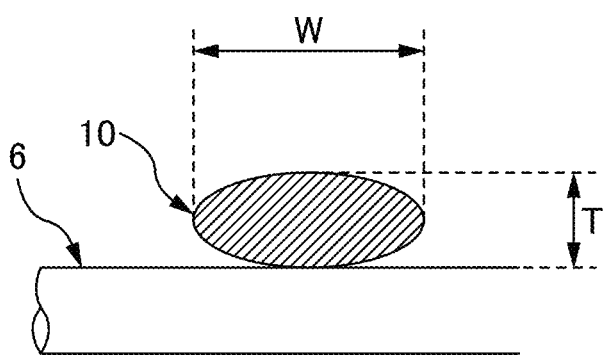

FIG. 4A to FIG. 4C are sectional views of a bundling member 10 for explaining sectional shapes of the bundling member 10. The sectional shapes of the bundling member 10 can be various shapes. FIG. 4A shows a case where the sectional shape of the bundling member 10 is a substantially square shape. FIG. 4B shows a case in which the sectional shape of the bundling member 10 is shaped with the substantially square shape in FIG. 4A rounded in the corner parts of the substantially square shape. FIG. 4C shows a case where the sectional shape of the bundling member 10 is a substantially circular shape (includes an oval shape).

Next, parts which refer to a thickness and a width of each of the shapes are defined in this specification. In the sectional shapes shown in FIG. 4A to FIG. 4C, the shortest part in cross section is referred to as a thickness T, and the longest part that intersects the thickness direction is referred to as a width W. It should be noted that, FIG. 4A to FIG. 4C show the case where the bundling member 10 is not upright and is wound around the optical fiber bundle 6, and the above-described definition does not change even in the case where the bundling member 10 is upright as will be described later.

Figure 5:
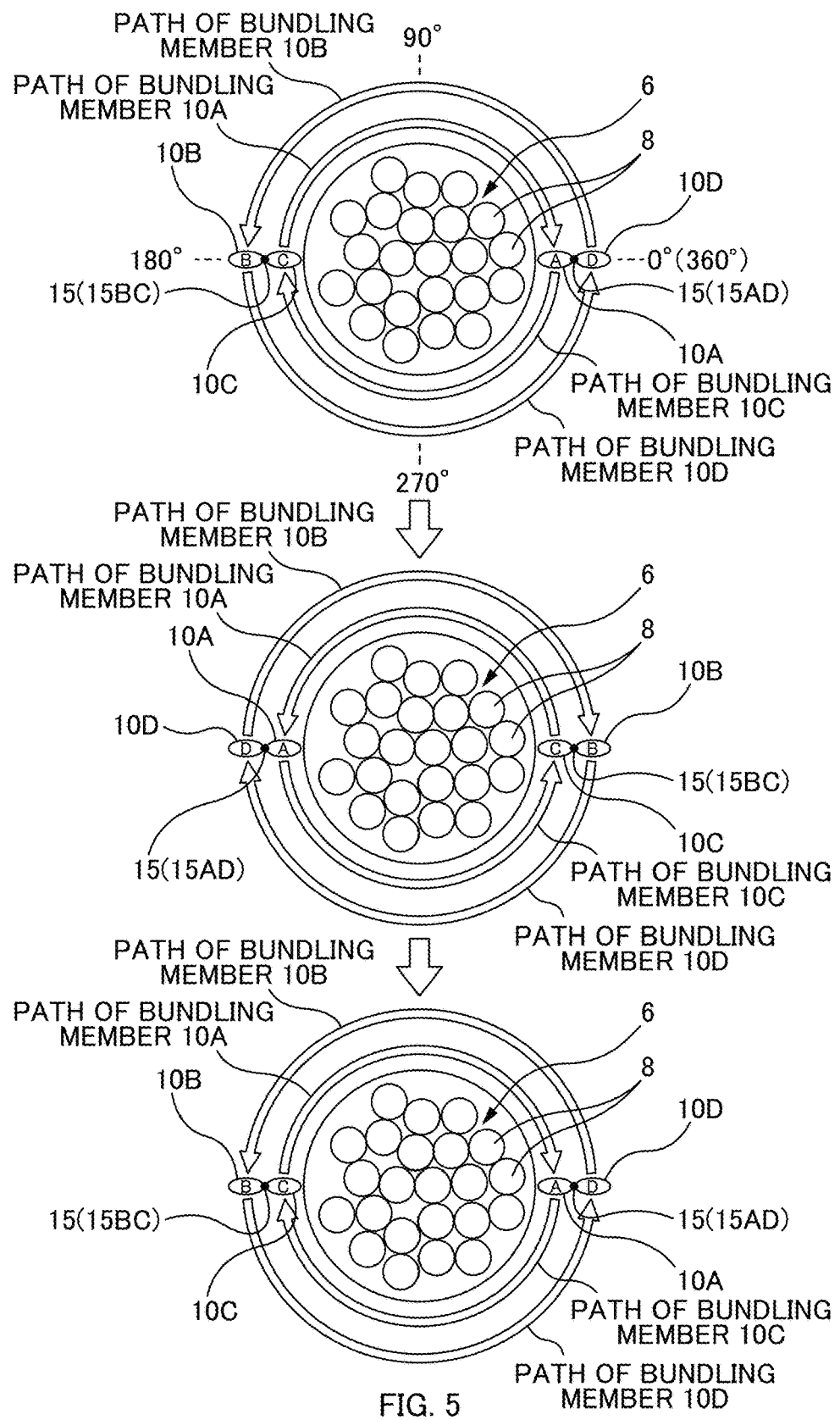
FIG. 5 is an explanatory view explaining how to wind bundling members 10.

FIG. 5 is an explanatory view explaining how to wind the bundling members 10. Below, winding of the bundling member 10 around the optical fiber bundle 6 is explained with reference to FIG. 1B.

The bundling member 10 is arranged such as to be wound on an outer circumference of the optical fiber bundle 6, in an arc shape for half the circumference (for 180 degrees) and along the length direction of the optical fiber unit 2. Then, the bundling member 10 is joined to another bundling member 10 at the joined point 15. Further, the winding direction of the bundling member 10 is reversed in respect to the optical fiber bundle 6 at the joined point 15 with another bundling member 10. In this way, the bundling member 10 is wound around the optical fiber bundle 6 in an S-Z configuration. It should be noted that, in the below description, an index AD is added to the joined point 15 between the bundling member 10A and the bundling member 10D, and an index BC is added to the joined point 15 between the bundling member 10B and the bundling member 10C, so that the joined points 15 can be differentiated in the explanation.

The bundling member 10 is wound on an outer circumference of the optical fiber bundle 6 along the length direction of the optical fiber bundle 6, while reversing the winding direction alternately, and is joined to another bundling member 10 in the section where the winding direction is reversed. In this way, when the joined point of the section in which the bundling member is reversed is separated, the bundling member 10 coating the periphery of the optical fiber bundle 6 in a net shape can be opened, and the optical fibers 8 can be taken out from the optical fiber unit 2.

The joining strength of the joined point 15 may be such that the joined point 15 is not unintentionally destroyed, whereas the joined point 15 can be easily separated with hands of an operator. A force necessary to separate the joined point 15 of the bundling member 10 may be smaller than a force required to cut the bundling member 10, and thus a joining strength of the bundling member 10 may be a breaking strength or less of the bundling member 10. Further, after the optical fiber 8 has been taken out in mid-span branching, the two bundling members 10 may be joined again by applying adhesive, or heating with a heater.

The joined points 15 are arranged so as to sandwich the optical fiber bundle 6, when the optical fiber unit 2 is seen from one side of the length direction as shown in FIG. 5. Here for illustrative purposes, a position of one joined point 15 is a reference position (0 degrees), and a position of the other joined point is at 180 degrees. In the Reference example, joined points 15AD and joined points 15BC are present in the reference position and in the position at 180 degrees.

First, winding of the bundling member 10A and the bundling member 10D of the four bundling members 10 is described. The bundling member 10A is wound clockwise on an outer circumference of the optical fiber bundle 6 (see upper view in FIG. 5), is joined to the bundling member 10D at joined point 15AD (see upper view in FIG. 5), is reversed in the winding direction and is wound anticlockwise on an outer circumference of the optical fiber bundle 6 (see center view in FIG. 5), joined to the bundling member D at joined point 15AD (see center view in FIG. 5), wound clockwise on an outer circumference of the optical fiber bundle 6 again (see lower view in FIG. 5 (or upper view in FIG. 5)), and this is repeated. Further, the bundling member 10A is wound anticlockwise on an outer circumference of the optical fiber bundle 6 (see upper view in FIG. 5), is joined to the bundling member 10A at joined point 15AD (see upper view in FIG. 5), the winding direction is reversed and is wound clockwise on an outer circumference of the optical fiber bundle (see center view in FIG. 5), joined to the bundling member 10A at joined point 15AD (see center view in FIG. 5), wound anticlockwise on an outer circumference of the optical fiber bundle 6 again (see lower view in FIG. 5 (or upper view in FIG. 5)), and this is repeated. In this way, as shown in FIG. 1B, the bundling member 10A and the bundling member 10D are wound around the optical fiber bundle 6 in an S-Z configuration. Further, when seen from one side in the length direction of the optical fiber unit 2 as shown in FIG. 5, two joined points 15AD are arranged so as to sandwich the optical fiber bundle 6 (joined points 15AD are arranged in positions at 0 degrees and 180 degrees).

The bundling member 10B and the bundling member 10C are similarly wound around the optical fiber bundle 6 in an S-Z configuration, as shown in FIG. 1B. Two joined points 15BC are arranged so as to sandwich the optical fiber bundle 6 (joined points 15BC are arranged at positions of 0 degrees and 180 degrees) when viewed from one side in the length direction of the optical fiber unit 2 as shown in FIG. 5.

<Twist of Bundling Member 10 in Section where Direction is Reversed>

Figure 6:
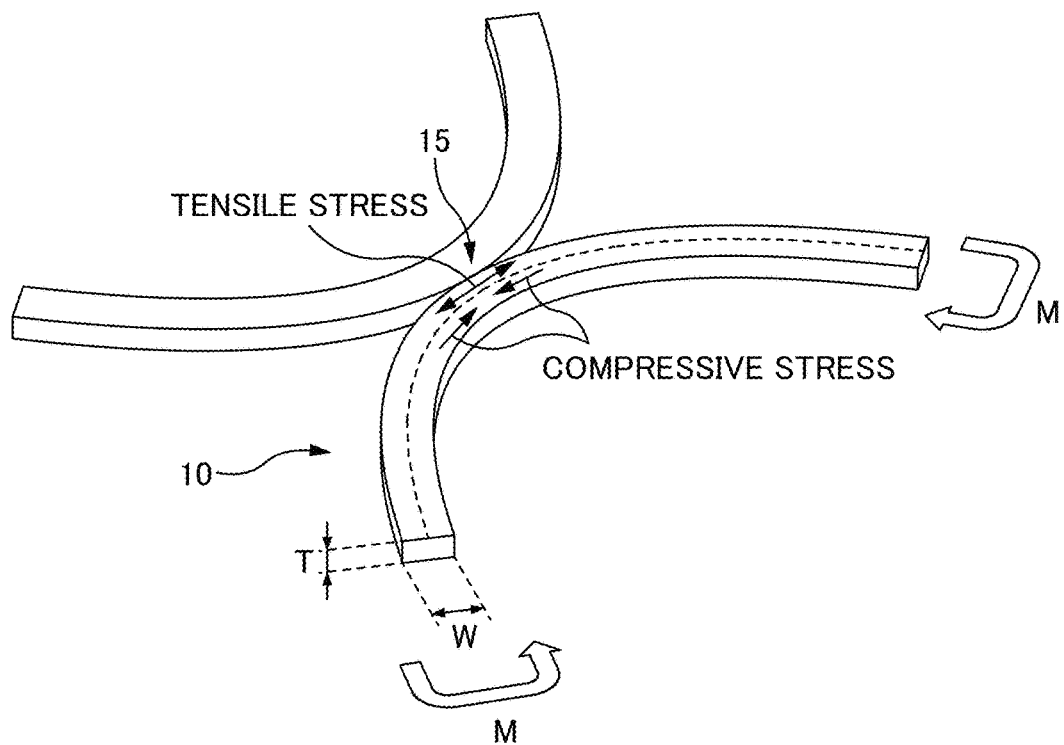
FIG. 6 is a perspective view of a joined point 15 of bundling members 10 enlarged in a comparative example.

FIG. 6 is an enlarged perspective view showing a part near a joined point 15 of bundling members 10 of a comparative example. It should be noted that, only the bundling members 10 are shown in FIG. 6 to make the description easier to understand, and the optical fiber bundle 6 is not shown. As shown in FIG. 6, the bundling member 10 that has been wound around in an S-Z configuration is reversed in the winding direction at a joined point 15 with another bundling member 10. When the winding direction of the bundling member 10 is reversed, bending stress M is caused in the bundling member 10. The bending stress M is a generic term for two stresses of a compressive stress in an inner side of the bend and a tensile stress to an outer side of the bend, with a center line of the bundling member 10 as a reference as shown by a broken line in FIG. 6.

By the way, the bending stress that generally develops in a member is known to vary depending on the sectional shape. In other words, the flexibility of the member depends on the sectional shape. Further, it is generally known that a member having the sectional shape with a thickness and a width that are different from each other such as a rectangle, has varying flexibility depending on the ratio of the width to the thickness. When the bundling member 10 shown in FIG. 6 is to be bent in the width direction, the greater the width W with respect to the thickness T the harder it becomes to bend. When the bundling member 10 with the width W of a certain amount or greater with respect to the thickness T is to be bent in the width direction, there is a possibility that the fiber unit is entangled in the optical fiber bundle of the other optical fiber unit, when contacted to the other optical fiber unit. The evaluation result is as shown in Table 1 below.

TABLE 1

| | | THICKNESS OF BUNDLING MEMBER [mm] | | | | | | | |
|---|---|---|---|---|---|---|---|---|---|
| | | 0.02 | 0.04 | 0.06 | 0.08 | 0.10 | 0.12 | 0.14 | 0.16 |
| WIDTH OF BUNDLING MEMBER [mm] | 0.20 | 10.0 ✓ | 5.0 ✓ | 3.3 ✓ | 2.5 ✓ | 2.0 ✓ | 1.7 ✓ | 1.4 ✓ | 1.3 ✓ |
| | 0.40 | 20.0 x | 10.0 ✓ | 6.7 ✓ | 5.0 ✓ | 4.0 ✓ | 3.3 ✓ | 2.9 ✓ | 2.5 ✓ |
| | 0.60 | 30.0 x | 15.0 ✓ | 10.0 ✓ | 7.5 ✓ | 6.0 ✓ | 5.0 ✓ | 4.3 ✓ | 3.8 ✓ |
| | 0.80 | 40.0 x | 20.0 x | 13.3 ✓ | 10.0 ✓ | 8.0 ✓ | 6.7 ✓ | 5.7 ✓ | 5.0 ✓ |
| | 1.00 | 50.0 x | 25.0 x | 16.7 ✓ | 12.5 ✓ | 10.0 ✓ | 8.3 ✓ | 7.1 ✓ | 6.3 ✓ |
| | 1.20 | 60.0 x | 30.0 x | 20.0 x | 15.0 ✓ | 12.0 ✓ | 10.0 ✓ | 8.6 ✓ | 7.5 ✓ |
| | 1.40 | 70.0 x | 35.0 x | 23.3 x | 17.5 ✓ | 14.0 ✓ | 11.7 ✓ | 10.0 ✓ | 8.8 ✓ |
| | 1.60 | 80.0 x | 40.0 x | 26.7 x | 20.0 x | 16.0 ✓ | 13.3 ✓ | 11.4 ✓ | 10.0 ✓ |
| | 1.80 | 90.0 x | 45.0 x | 30.0 x | 22.5 x | 18.0 ✓ | 15.0 ✓ | 12.9 ✓ | 11.3 ✓ |
| | 2.00 | 100.0 x | 50.0 x | 33.3 x | 25.0 x | 20.0 x | 16.7 ✓ | 14.3 ✓ | 12.5 ✓ | stress cannot be borne with only bending deformation of the member. At this time, the compressive stress and the tensile stress affect the direction of the twist, as a result there is a case where the bundling member 10 twists and deforms.

Figure 7:
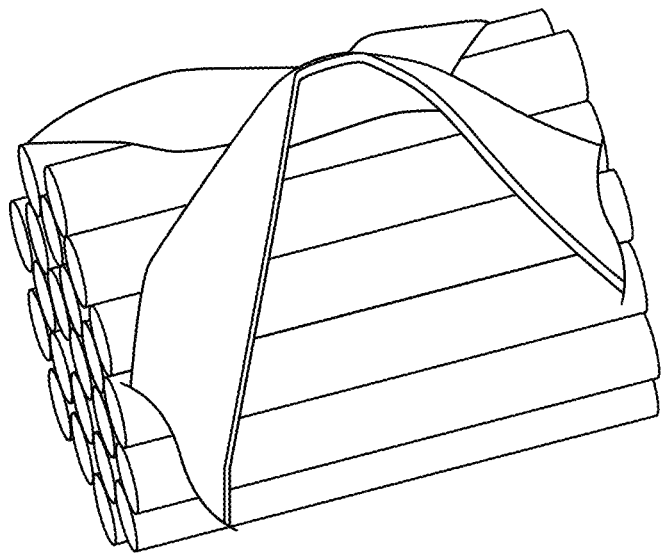
FIG. 7 is a perspective view of a joined part of bundling members 10 that is upright and joined in a section where winding directions of bundling members are reversed.

FIG. 7 is a perspective view of a joined part of the bundling members 10 that are upright and joined in a section where winding directions of bundling members are reversed. In the case where the compressive stress affects the upright direction with respect to the optical fiber bundle 6, and the tensile stress affects the length direction of the optical fiber bundle 6, the bundling members 10 are twisted, and as a result the section where the bundling member 10 is reversed stands and is joined. The joined parts of the bundling members 10 that are upright in this way entangle with optical fibers of other optical fiber bundles 6, to largely bend the optical fiber locally, and to possibly cause increase of transmission loss. Further, there is a possibility of breaking the optical fibers that have been entangled.

First Embodiment (Evaluation of Characteristic of Entanglement Caused by Bundling Member Joined Part)

Entanglement of an optical fiber caused by the joined part of the bundling members 10 occurs when the joined part of the bundling members are upright in the case where the width W is equal to or greater than a certain amount with respect to the thickness T of the bundling member. A plurality of prototype optical fiber units were formed in respect to the section size of the bundling member, to evaluate the characteristic of entanglement caused by the joined part of the bundling members 10.

First, the plurality of the prototype optical fiber units each has 80 optical fibers that are aggregated, and is wound with the bundling member in an S-Z configuration. The wrapping method of the bundling member is the same as that shown in FIG. 1B and FIG. 5. The plurality of prototype optical fiber units with varying widths and thicknesses are formed, are each rotated, and it was evaluated whether or not the joined part of the bundling members of the prototype optical fiber unit is entangled in the optical fiber bundle of the other optical fiber unit, when contacted to the other optical fiber unit. The evaluation result is as shown in Table 1 below.

In Table 1, the upper row of each evaluation result field shows a ratio of a width of a bundling member to a thickness of a bundling member. Below, this ratio is referred to as a width-thickness ratio. In the lower row of the evaluation result field, when the prototype optical fiber unit is made to contact another optical fiber unit and the joined part does not get entangled in rotation it is shown by "✓", and when the joined part gets entangled in rotation it is shown by "x". When the result is "✓", the optical fiber unit can be evaluated as a satisfactory optical fiber unit in which the joined part being upright is suppressed such that entanglement of an optical fiber caused by the joined part of the bundling members does not occur.

As is clear from the results shown in Table 1, the prototype optical fiber units with a width-thickness ratio of less than 20.0 are evaluated as "✓". Of the prototype optical fiber units evaluated as "✓", the prototype optical fiber unit with the greatest width-thickness ratio has a width of 1.80 mm, a thickness of 0.10 mm, and a width-thickness ratio of 18.0. Thus, from the above results, the optical fiber unit with the width-thickness ratio of smaller than 20.0, may be equal to or smaller than 18.0, is a satisfactory optical fiber unit in which the joined part being upright is suppressed such that entanglement of an optical fiber caused by the joined part of the bundling members does not occur.

(How Twist Occurs Depending on Joining Method of Bundling Member)

Joining of the bundling members 10 is carried out using an adhesive or by heat-sealing. Of these cases, compared to heat-sealing, twist easily occurs in the bundling member in the section where the winding direction is reversed when joining with an adhesive. This is because in heat-sealing the coating part 12 (see FIG. 3) of the bundling member 10 melts and becomes slight easily deformable, thus the bundling member 10 becomes more easy to bend. Thus, the optical fiber unit with the above-described numerical range is particularly advantageous when joining with an adhesive.

Second Embodiment

<Protruding Out of Optical Fiber>

In the above-described Reference example, when the optical fiber unit is bent, an optical fiber may protrude out from a gap surrounded with the bundling members. When this protruded out portion of the optical fiber gets entangled in another optical fiber unit, or gets entangled in the bundling member, local bending of the optical fiber causes transmission loss increase and breakage of optical fibers.

Figure 8:
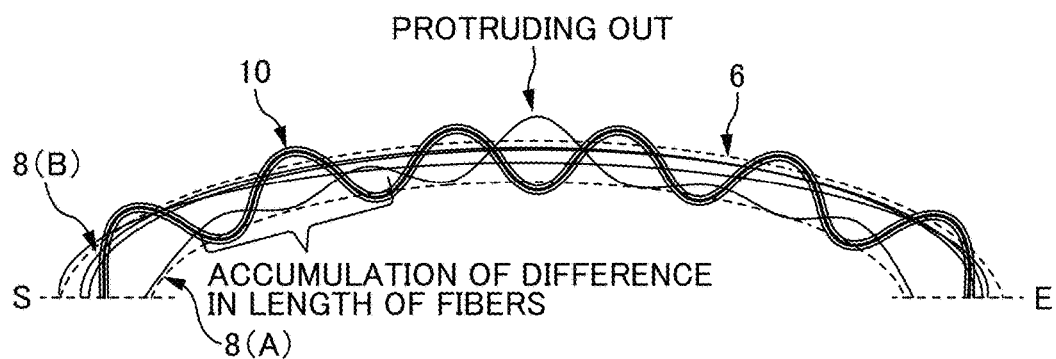
FIG. 8 is a diagram explaining an optical fiber unit 2 in which an optical fiber 8 has protruded out.

FIG. 8 is a diagram explaining an optical fiber unit 2 in which an optical fiber 8 has protruded out. Note that, to make explanation simpler in FIG. 8, only one of the plurality of bundling members 10 is shown, and other bundling members 10 that are to be joined to this bundling member are not shown. In the below description, indexes (A, B) are added to the optical fibers 8. As shown in FIG. 8, when the optical fiber unit 2 is bent, a difference in line length arises between the paths of the optical fibers 8 from an S point to an E point. For example, the length of the path of an optical fiber 8(A) that passes an inner side of the bend becomes shorter than the length of the path of an optical fiber 8(B) that passes an outer side of the bend.

As the optical fiber 8(A) is wound with the bundling member 10 and is tied, however, the optical fiber 8(A) actually passes a path to resolve the difference in line length with the optical fiber 8(B). In other words, the optical fiber 8(A) accumulates the difference in line length by winding, to try to resolve the difference in line length with the optical fiber 8(B). But, when the optical fiber bundle is wound around a drum and the like so as to be bent continuously, the difference in line length cannot be resolved merely with winding, and after a certain amount of accumulation of the difference in line length, an optical fiber finally protrudes out from a gap surrounded with the bundling members 10.

<Exposed Area of Optical Fiber>

Figure 9:
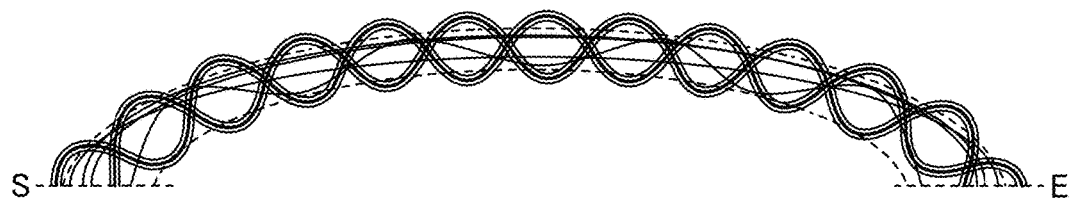
FIG. 9 is a diagram explaining an optical fiber unit 2 of a second embodiment.

FIG. 9 is a diagram explaining an optical fiber unit 2 of a second embodiment. As shown in FIG. 9, by increasing the number of bundling members and making a pitch of winding of the bundling member short, the protruding out of the optical fiber 2 can be suppressed. This is because the portion where the bundling member 10 is not wound around, that is an area where the optical fibers are exposed becomes smaller, and as a result protruding out of the optical fiber 2 can be suppressed.

Figure 10A:
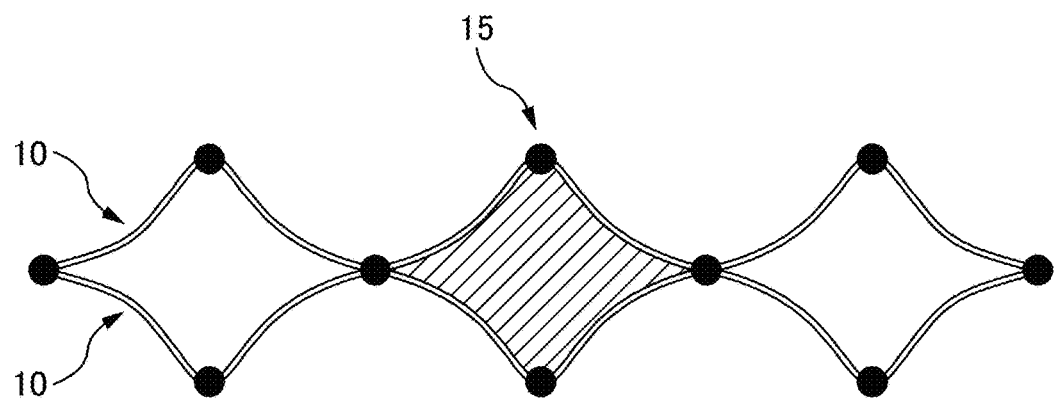
FIG. 10A is a developed view of bundling members 10 for explaining an exposed area of optical fibers.

FIG. 10A is a developed view of bundling members 10 explaining an exposed area of optical fibers. FIG. 10A shows a peripheral surface of the optical fiber bundle 6 virtually as a circumferential surface, and shows the bundling members 10 wound on an outer circumference of the optical fiber bundle 6 unfolded. The bundling member 10 is wound on the outer circumference of the optical fiber bundle 6 while reversing the winding direction alternately along the length direction thereof, and is joined to another bundling member 10 in a section in which the winding direction is reversed. An exposed area in this example, is an area of a region surrounded with bundling members as shown by a shaded part in FIG. 10A.

Figure 10B:
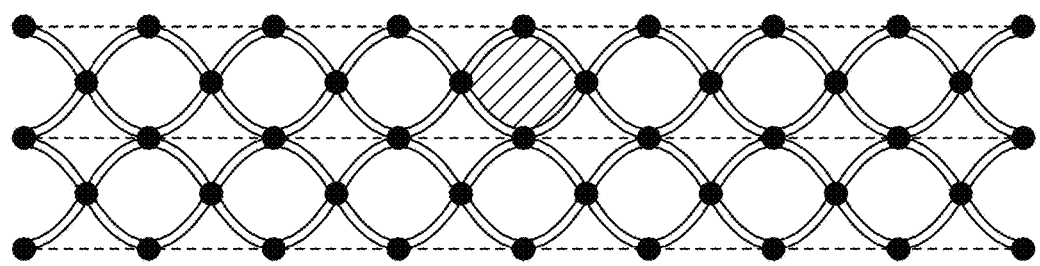
FIG. 10B is a developed view of other bundling members 10 for explaining an exposed area of optical fibers.

FIG. 10B is a developed view of other bundling members 10 for explaining an exposed area of optical fibers. In FIG. 10B four bundling members 10 are arranged, and the bundling members 10 are joined not only in sections in which the winding direction is reversed, but also at intersections where the bundling members intersect with other bundling members 10. The exposed area in this example is an area of a region surrounded with bundling members shown by a shaded part in FIG. 10B.

<Evaluation of Protruding Characteristic of Optical Fiber>

Protruding out of an optical fiber is caused when an exposed area is a certain area or greater. A plurality of prototype optical fiber units were made with respect to exposed areas, and a protruding characteristic of an optical fiber was evaluated.

First, an optical fiber bundle having 8 fiber ribbons with discontinuous connections for a total of 80 fibers, and a bundling member with a thickness of 0.08 mm and a width of 1.4 mm were prepared. A plurality of prototype optical fiber units were formed in which the winding pitch of the bundling member has been changed to thus change the exposed area, in respect to bundling members that have been changed in number from two to eight. The prototype optical fiber units were bent, to evaluate whether or not the optical fiber protrudes out. The evaluation results are as shown in Table 2 below.

TABLE 2

| EXPOSED AREA [mm²] | NUMBER OF BUNDLING MEMBERS [NUMBER] | | | | | | |
|---|---|---|---|---|---|---|---|
| | 2 | 3 | 4 | 5 | 6 | 7 | 8 |
| 3 | ✓ | ✓ | ✓ | ✓ | ✓ | ✓ | ✓ |
| 5 | ✓ | ✓ | ✓ | ✓ | ✓ | ✓ | ✓ |
| 10 | ✓ | ✓ | ✓ | ✓ | ✓ | ✓ | ✓ |
| 20 | ✓ | ✓ | ✓ | ✓ | ✓ | ✓ | ✓ |
| 30 | ✓ | ✓ | ✓ | ✓ | ✓ | ✓ | ✓ |
| 50 | ✓ | ✓ | ✓ | ✓ | ✓ | ✓ | ✓ |
| 75 | ✓ | ✓ | ✓ | ✓ | ✓ | ✓ | ✓ |
| 100 | ✓ | ✓ | ✓ | ✓ | ✓ | ✓ | ✓ |
| 150 | ✓ | ✓ | ✓ | ✓ | ✓ | ✓ | x |
| 200 | ✓ | ✓ | ✓ | ✓ | ✓ | x | x |
| 250 | ✓ | ✓ | ✓ | ✓ | x | x | x |
| 300 | ✓ | ✓ | ✓ | x | x | x | x |
| 400 | ✓ | ✓ | x | x | x | x | x |
| 500 | ✓ | x | x | x | x | x | x |
| 600 | ✓ | x | x | x | x | x | x |
| 700 | x | x | x | x | x | x | x |

In Table 2, an evaluation result field in which the optical fiber has not protruded out is shown as "✓", and an evaluation result field in which the optical fiber has protruded out is shown as "x". If the result is "✓", the optical fiber unit can be evaluated as being a satisfactory optical fiber unit in which the optical fiber does not protrude out even when the optical fiber unit is bent.

From the results of Table 2, the below equation 1 can be shown with an exposed area as S (mm²), and the number of bundling members as N (number).

[Number 1]

$$S \leq 1200/N \quad \text{(Equation 1)}$$

Further, whether or not protruding out occurs when using a single optical fiber with 1 fiber was also evaluated. The evaluation results are as shown in Table 3 below.

From the results of Table 2 and Table 3, conditions for an exposed area S for one optical fiber can be obtained. The following Equation 2 is shown with an exposed area as S (square mm), the number of bundling members as N (number), number of fibers per one optical fiber (including a ribbon) as A.

[Number 2]

$$S \leq 150A/N \quad \text{(Equation 2)}$$

TABLE 3

| EXPOSED AREA [mm²] | NUMBER OF BUNDLING MEMBERS [NUMBER] | | | | | | |
|---|---|---|---|---|---|---|---|
| | 2 | 3 | 4 | 5 | 6 | 7 | 8 |
| 3 | ✓ | ✓ | ✓ | ✓ | ✓ | ✓ | ✓ |
| 5 | ✓ | ✓ | ✓ | ✓ | ✓ | ✓ | ✓ |
| 10 | ✓ | ✓ | ✓ | ✓ | ✓ | ✓ | ✓ |
| 20 | ✓ | ✓ | ✓ | ✓ | ✓ | x | x |
| 30 | ✓ | ✓ | ✓ | ✓ | x | x | x |
| 50 | ✓ | ✓ | x | x | x | x | x |
| 75 | ✓ | x | x | x | x | x | x |
| 100 | x | x | x | x | x | x | x |
| 150 | x | x | x | x | x | x | x |
| 200 | x | x | x | x | x | x | x |
| 250 | x | x | x | x | x | x | x |
| 300 | x | x | x | x | x | x | x |
| 400 | x | x | x | x | x | x | x |
| 500 | x | x | x | x | x | x | x |
| 600 | x | x | x | x | x | x | x |
| 700 | x | x | x | x | x | x | x |

<Evaluation of Waterproof Characteristic>

Depending on the application environment of the optical fiber cable, water may infiltrate into the optical fiber cable. The infiltrated water reaches a junction box such as a closure through the optical fiber cable, and there is a possibility that the water may affect other optical fiber cables via the junction box. Thus, the optical fiber cable needs to have satisfactory waterproof characteristic. Generally, waterproof performance inside the optical fiber unit is increased by applying a waterproof material to a surface of the wrapping tape 5 facing the optical fiber unit shown in FIG. 1A. At this time, when the area of the region surrounded by the bundling members, namely the exposed area, is smaller than a certain value, the waterproof material is blocked with the bundling members and does not spread over the inside of the optical fiber unit. As a result, the waterproof characteristic may deteriorate.

The waterproof characteristic of the above prototype optical fiber cable was evaluated. The evaluation was carried out with the prototype optical fiber cable length as 40 m, water being injected from an end face of an optical fiber cable with water head length of 1 m, and with a test time of 240 hours. As the water for the evaluation, artificial seawater with 24.5 g of sodium chloride and 11.1 g of magnesium chloride hexahydrate dissolved per 1 liter of water was used. The evaluation results are as shown in Table 4 below.

TABLE 4

| EXPOSED AREA [mm²] | NUMBER OF BUNDLING MEMBERS [NUMBER] | | | | | | |
|---|---|---|---|---|---|---|---|
| | 2 | 3 | 4 | 5 | 6 | 7 | 8 |
| 3 | x | x | x | x | x | x | x |
| 5 | x | x | x | x | x | x | x |
| 10 | ✓ | ✓ | ✓ | ✓ | ✓ | ✓ | ✓ |
| 20 | ✓ | ✓ | ✓ | ✓ | ✓ | ✓ | ✓ |

From the results in Table 4, the waterproof performance does not depend on the number of the bundling members, and by making an exposed area 10 square mm or greater, sufficient effect was achieved.

From the results of Table 2 to Table 4, an upper limit and a lower limit of the exposed area S for one optical fiber can be obtained. The equation is below Equation 3 as shown with an exposed area as S (square mm), the number of bundling members as N (number), and the number for one optical fiber (including ribbon) as A.

[Number 3]

$$10 \leq S \leq 150 A/N \qquad \text{(Equation 3)}$$

Other Embodiment

The foregoing embodiments are for facilitating the understanding of the present invention, and are not to be construed as limiting the present invention. The present invention may be modified and/or improved without departing from the gist thereof, and it goes without saying that the present invention encompasses any equivalents thereof.

<Number of Bundling Members 10>

The foregoing embodiment describes an example in which there are four bundling members 10 wound on the optical fiber bundle 6. However, the number of bundling members 10 to be provided in a single optical fiber unit 2 is not limited thereto. For example, there may be six or more bundling members, or an odd number of bundling members.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

REFERENCE SIGNS LIST 1 optical fiber cable, 2 optical fiber unit, 3 outer sheath,
4A tension member, 4B rip cord, 5 wrapping tape,
6 optical fiber bundle, 7 optical fiber ribbon with discontinuous connections,
8 optical fiber, 9A connection part, 9B non-connected part,
10 bundling member,
15 joined part

The invention claimed is:

1. An optical fiber unit comprising:
   an optical fiber bundle formed by bundling a plurality of optical fibers; and
   a plurality of bundling members, wherein
   one bundling member of the plurality of bundling members:
      is wound on an outer circumference of the optical fiber bundle in a length direction of the optical fiber bundle, while reversing a winding direction alternately, and
      is joined to another bundling member at a section where the winding direction is reversed, wherein
      a ratio of a width of a cross-section of the bundling member to a thickness of the cross-section of the bundling member is smaller than 20.

2. The optical fiber unit according to claim 1, wherein the ratio of a width of the cross-section of the bundling member to the thickness of the cross-section of the bundling member is equal to or smaller than 18.

3. The optical fiber unit according to claim 1, wherein the bundling members are joined with an adhesive.

4. The optical fiber unit according to claim 1, wherein an area in which the optical fiber is exposed from the bundling member on the outer circumference of the optical fiber bundle is equal to or smaller than 150A/N mm², where A is a number of the optical fibers, and N is a number of the bundling members.

5. The optical fiber unit according to claim 4, wherein the area in which the optical fiber is exposed from the bundling member on the outer circumference of the optical fiber bundle is equal to or smaller than 10 mm$^2$.

6. An optical fiber cable comprising:

a plurality of optical fiber units; and an outer sheath that coats a plurality of the optical fiber units, wherein the optical fiber unit comprises:

an optical fiber bundle bundling a plurality of optical fibers; and a plurality of bundling members, one bundling member of the plurality of bundling members:

is wound on an outer circumference of the optical fiber bundle along a length direction of the optical fiber bundle, while reversing alternately a winding direction, and is joined to another bundling member at a section where the winding direction is reversed, wherein a ratio of a width of a cross-section of the bundling member to a thickness of cross-section of the bundling member is smaller than 20.

7. An optical fiber unit comprising:

an optical fiber bundle formed by bundling a plurality of optical fibers; and a plurality of bundling members, wherein a first bundling member of the plurality of bundling members:

is wound on an outer circumference of the optical fiber bundle in a length direction of the optical fiber bundle, while reversing a winding direction alternately, and is joined to a second bundling member at a section where the winding direction is reversed, wherein a third bundling member of the plurality of bundling members:

is wound on an outer circumference of the optical fiber bundle in a length direction of the optical fiber bundle, while reversing a winding direction alternately, and is joined to a fourth bundling member at a section where the winding direction is reversed, wherein the first bundling member and the third bundling member form a first intersection and are joined at the first intersection, and the second bundling member and the fourth bundling member form a second intersection and are joined at the second intersection, wherein a ratio of a width of a cross-section of each bundling member to a thickness of the cross-section of the same bundling member is smaller than 20, and wherein an area in which the optical fiber is exposed from the bundling member on the outer circumference of the optical fiber bundle is equal to or smaller than 150A/N mm$^2$, where A is a number of the optical fibers, and N is a number of the bundling members.

8. The optical fiber unit according to claim 1, wherein the ratio of the width of the cross-section of the bundling member to the thickness of the cross-section of the bundling member is equal to or greater than 1.3.

* * * * *